United States Patent [19]

Mehringer et al.

[11] Patent Number: 5,333,627
[45] Date of Patent: Aug. 2, 1994

[54] DISPENSER DEVICE FOR HUMAN HAIR

[76] Inventors: Ricardo F. Mehringer, Chaco 137, Don Bosco - Buenos Aires; Hugo A. Bardon, De Pinedo 839; Augusto P. Pozzetti, De Pinedo 791, both of Bernal - Buenos Aires, all of Argentina

[21] Appl. No.: 74,025

[22] Filed: Jun. 2, 1993

[30] Foreign Application Priority Data

Jun. 2, 1992 [AR] Argentina .................... 322.463

[51] Int. Cl.⁵ ...................... A45D 24/22; A45D 24/26
[52] U.S. Cl. ........................ 132/108; 132/112; 132/116; 401/176; 401/179; 401/287; 401/290
[58] Field of Search ............... 401/176, 179, 181, 290, 401/287; 132/108, 112, 116

[56] References Cited

U.S. PATENT DOCUMENTS

| | | | |
|---|---|---|---|
| 972,793 | 10/1910 | Allred | 401/179 X |
| 1,644,356 | 10/1927 | Rogers | 401/176 X |
| 4,456,450 | 6/1984 | Heling | 401/176 X |
| 4,934,388 | 6/1990 | Gibbs | 401/176 X |
| 5,152,305 | 10/1992 | Niv | 401/176 X |

FOREIGN PATENT DOCUMENTS

| | | | |
|---|---|---|---|
| 3122516 | 12/1982 | Fed. Rep. of Germany | 401/176 |
| 2400865 | 4/1979 | France | 401/176 |
| 82697 | 2/1935 | Sweden | 401/176 |
| 273346 | 5/1951 | Switzerland | 401/176 |

*Primary Examiner*—Steven A. Bratlie
*Attorney, Agent, or Firm*—McGlew and Tuttle

[57] ABSTRACT

A container 3 contains fluid to be applied to human hair. A plunger 5 is movably mounted in the container 3 and moves the fluid towards a dispenser and of the housing. An expulsion base is mounted on the dispenser end of the housing. This expulsion base defines a plurality of container channels. A removable dispenser head is mounted on the expulsion base and the dispenser then defines a plurality of head channels. These head channels are substantially aligned with the container channels at one end of the dispenser head. The head channels are distributed along another end of the dispenser head. A spreading device is positioned at the another end of the dispenser head and receives fluid from the dispenser head and spreads out the fluid on the hair.

8 Claims, 2 Drawing Sheets

DISPENSER DEVICE FOR HUMAN HAIR

FIELD OF THE INVENTION

The present invention is a dispenser suitable for being used as an applicator of dyes, solutions of liquid hair creams and other products, which are used for both the aesthetic and therapeutic treatment of hair. More specifically, the present invention pertains to a device of the type specified, which is mechanically operated and is particularly useful as a working tool for professional hairdresser specialists, since the device optimizes the action of the liquid and semi-liquid products which the specialists require in their work.

BACKGROUND OF THE INVENTION

Currently, the method of application of these types of products is entirely manual. The professional smears his hands with the products, mixes them and then distributes them by smearing them on the hair.

The method of application mentioned in the above paragraph entails some disadvantages, among which the following stand out: a) it is very difficult to obtain a suitable dispensing of the products which are used; b) it is very difficult to obtain an equal, accurate and uniform distribution; c) the task of the distribution is very slow and awkward, especially when the distribution is not complete and locks of hair are neglected by not receiving treatment.

Other known means are dye applicators with a wide-mouthed container and a brush. The dye and oxygenated water are mixed in the wide-mouthed container using a brush. The wide-mouthed container is positioned in front of an "assistant", and using the brush, the dye is applied as a mixture to the roots of the hair and then to the length and the ends of the hair. This operation usually lasts 15 minutes, and during which time the dye located in the wide-mouthed container begins to oxidize and lose its properties. Consequently, in the first brush strokes, the efficiency is more effective than with the last brush strokes, where the dye has suffered considerable losses in its properties due to oxidation.

The "feeding bottle" applicators, which consist of a flexible, empty container with a manually operated drain spout, are also known. This applicator is inadequate for work on roots, especially for making finishing touches, since it does not distribute the dye adequately. It requires the use of a comb which arranges the hair to be treated, and which action delays the task.

For the application of liquid products, it is the custom to use either the wide-mouthed container by absorbing the liquid with cotton and then applying it on the hair, or to use the feeding bottle by dividing the spout into sections and to perform the dispensing on the locks of hair. The disadvantage is evident in that, in the case of the wide-mouthed container, in addition to the liquid coming into contact with the hands, with staining or dirtiness of the hands being unavoidable, it is possible that the waving or setting solution loses its properties due to the prolonged contact with the air, with the end result that the work is unsatisfactory. In the case of the feeding bottle, not being able to measure out the amount of liquid to be used produces uncontrollable dirtying.

Other devices which may be used for these functions are not known.

SUMMARY AND OBJECTS OF THE INVENTION

The disadvantages indicated are clearly eliminated with the dispenser device of the present invention. In fact, the first advantage involving its use is evident with the neatness in the processing and mixture of the products that are used, as well as in the cleanliness and tidiness in their distribution on the hair. An adequate distribution of the products is obtained, without affecting those locks of hair that are intended to be excluded. It is possible to work with greater speed in distribution and likewise, the natural process of subsequent oxidation is delayed, considerably extending the useful life of the dyes, as a consequence of the above-mentioned uniform distribution of the products, since they are less exposed to the air.

These functional advantages are a direct result of the specific design idea of the device of the present invention.

The dispenser device for liquid and semiliquid products which can be applied to human hair, to which the present patent refers, is suitable for dispensing both dyes, such as a perm solution, a perm neutralizing solution and similar, commonly used mixtures for both the aesthetic and therapeutic treatment of hair. The present invention includes in combination, a syringe formed by a container of the product to be dispensed, and in whose interior a vertically displaceable plunger is moved. This rod is projected towards the outside by the upper base of the container, where a closing cover, which is passed through by the rod, is located. The lower base of this container includes a plurality of passing conductors or passages which extend to the outer surface of the same base where removable retention means for dispenser heads are incorporated. These removable retention means have passing channels which communicate, respectively, with the above-mentioned passages arranged on the lower base of the container. The invention also includes a propelling means which manually controls the vertical displacements of the rod. The rod consists of a lever of second class, whose fulcrum is an articulation point on the interior of the cover. The point of output is the free end of the rod. A succession of jack teeth arranged in vertical orientation about the rod are in a meshing arrangement in one direction with respect to the lever arm and define the resistance.

The present invention also includes an embodiment with removable dispenser heads having an absorbent pad on their free outer surface.

Another embodiment of the present invention include the removable dispenser heads incorporating inflexible bristle filaments or the like oriented towards the outside.

The filaments may also be flexible.

As an incidental object, the present invention foresees the possibility of the use of a long separating projection for the hair, made in one piece with an annular support which can be fixed on the syringe.

To specify the advantages thus briefly discussed, to which the readers and those skilled in the art can understand and add a great deal more, and to facilitate the understanding of the structural, design and functional characteristics of the device of the present invention, a description follows of a preferred exemplified embodiment, which is illustrated schematically and without a set scale on the attached sheets, with the express clarification that precisely using an example does not correspond to assigning to the same a limiting or exclusive nature of the scope of protection of the present patent, but simply represents a mere intention to explain or illustrate the basic idea on which the same is based.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawing.

In all the figures, the same or equivalent parts or structural components of the whole according to the example selected for the present explanation of the device of the present invention correspond to the same reference numbers.

DETAILED DESCRIPTION OF THE PREFERRED EMBODIMENT

Figures 1, 2, 3:
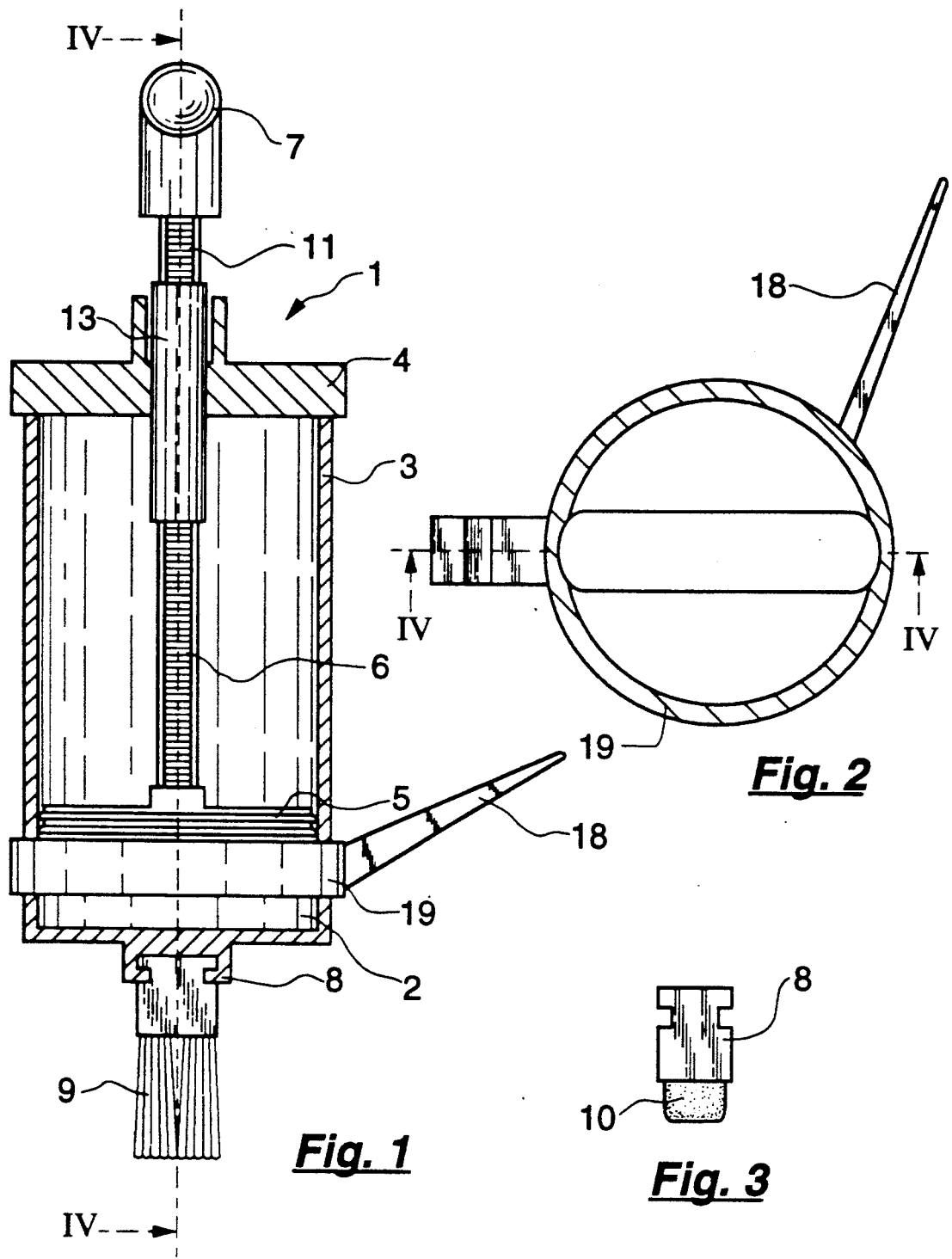
FIG. 1 is a lateral view which shows a dispenser device according to the present invention.
FIG. 2 is a schematic view of an accessory component which functions in combination with the device of the present invention.
FIG. 3 shows a removable dispenser head according to the present invention.

As can be seen in FIG. 1, the dispenser device for liquid and semiliquid products of the present invention, comprises, in combination, a receiving or driving syringe 1 of the product or mixture of the product to be applied and a removable dispenser head 2.

The syringe is defined by a container or housing 3 in which the liquid or semiliquid product, which will be dispensed, is housed. The upper base of the container 3 is the mouth and is closed with the cover 4 having a specific shape. In the interior of the container 3 and coaxially located is a vertically displaceable plunger 5 combined with the rod 6 which passes through the cover 4 and projects towards the outside where it ends with a vertical pushing knob 7.

The removable dispenser head 2 comprises an upper removable coupling section 8 such as a slide and a lower dispenser section 9 which, in FIG. 1, consists of a plurality of flexible bristles grouped together to form a dispenser brush. An absorbent tissue as well as dispenser body 10, forming a pad which is useful for distributing liquid products, such as those which are used to apply neutralizing solutions, is exemplified in FIG. 3.

Figures 4, 5:
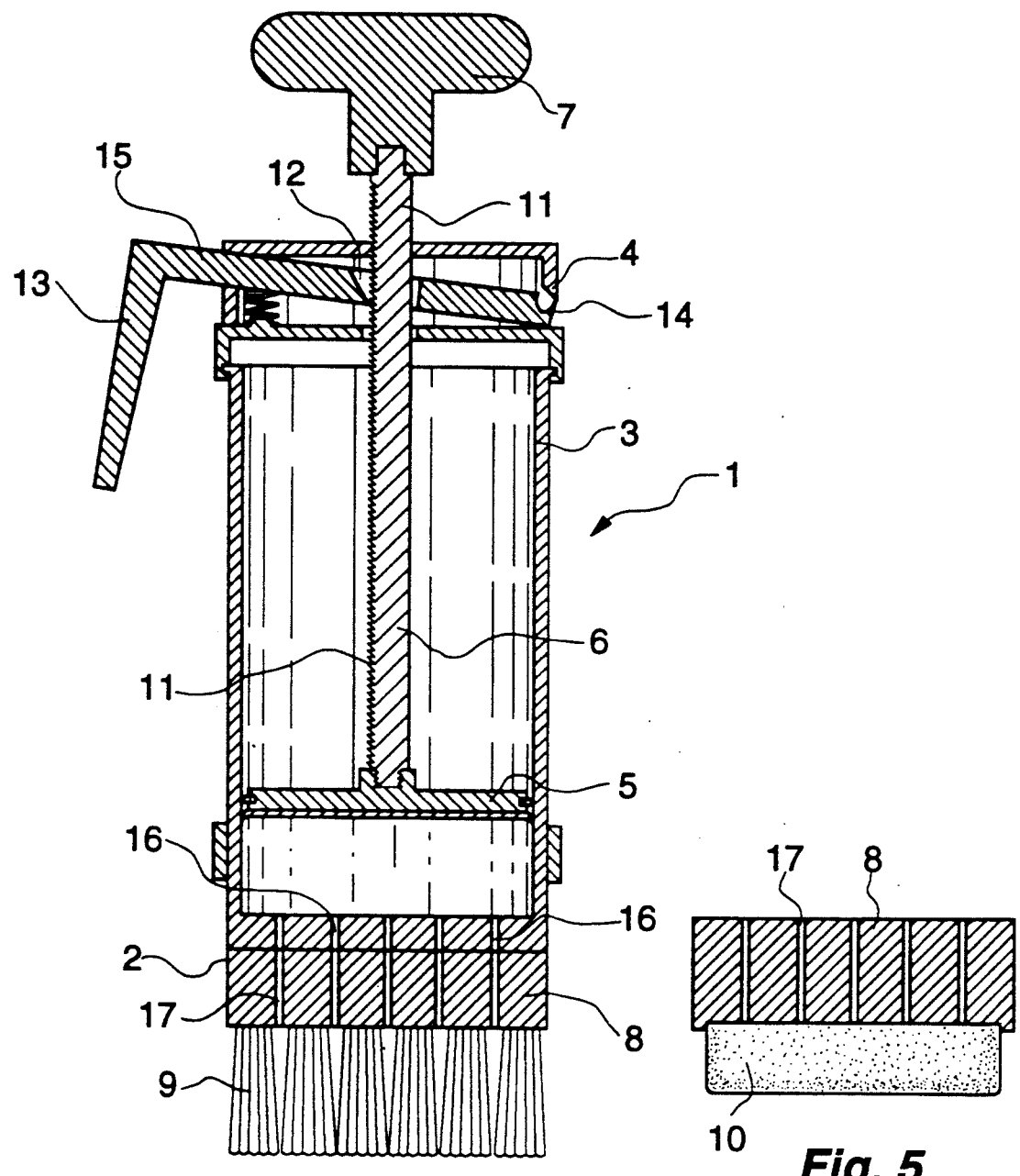
FIG. 4 is a longitudinal section according to the linear plane IV—IV which is indicated in FIG. 1.
FIG. 5 shows another removable dispenser head, belonging to the same invention.

For its function as a dispenser means, the above-mentioned rod 6 has, on one of its surfaces, an alignment of jack teeth 11 which face the oblique surface 12 of an opening located on the lateral pushing arm 13. As is evident in FIG. 4, this lateral pushing arm 13 consists of a second-class lever articulated on the tip 14 in the interior of the cover 4. The purpose of the means 15 is to accurately position the arm 13 in such a manner that the manual dispensing pressure produces the discharge of the product. For this purpose, on the lower expulsion base of the same container are located container channels 16 which, in the use position, communicate with head channels 17 of the head 2, which channels have theft outlet distributed between the above-mentioned bristles 9 or pad 10.

To retract the plunger 5, it is sufficient to twist the knob 7 and to pull same until the knob remains in an upwards position in the use condition.

During the application of the product on the hair of the user, a lock positioning means includes a long projection 18, made in one piece with the annular support 19, which is evident in FIGS. 1 and 2. The purpose of the lock positioning means is to assist with the arrangement of the locks of hair during the application of the products, is important.

It becomes clear, as explained above, that the device of the present invention responds in a very effective manner to the type of work of professional hairdressers, respecting their personal criteria for dispensing and giving them the opportunity to perform the task according to personal styles.

While specific embodiments of the invention have been shown and described in detail to illustrate the application of the principles of the invention, it will be understood that the invention may be embodied otherwise without departing from such principles.

What is claimed is:

1. Dispenser for applying a fluid to human hair, the dispenser comprising:
    a housing containing the fluid and having a mouth end and a dispenser end;
    a plunger means movably mounted in said housing and for moving the fluid toward said dispenser end of said housing;
    a rod connected to said plunger means and having an end extending out of said mouth end of said housing, said end of said rod having a knob means for manually moving the rod in an axial direction by an operator
    an expulsion base mounted on said dispenser end of said housing, said expulsion base defining a plurality of container channels;
    a removable dispenser head having one end mounted on said expulsion base, said dispenser head defining a plurality of head channels, said head channels being substantially aligned with said container channels at said one end, said head channels being distributed along another end of said dispenser head;
    spreading means positioned at said another end of said dispenser head and for receiving the fluid from said dispenser head and spreading the fluid on the hair;
    a removable cover positioned at said mouth end of said container and said rod passing through said removable cover;
    pushing means positioned in said cover and for axially pushing said rod and said plunger means to move the fluid out of the container and into said spreading means, said pushing means selectively engaging with said rod and axially moving said rod to move said plunger means toward said dispenser end, said pushing means also selectively engaging with said rod to block axial movement of said rod away from said dispenser end;
    lock positioning means for positioning locks of hair during application of the fluid to the hair.
2. A dispenser in accordance with claim 1, wherein: said spreading means includes groups of distributed flexible filaments.

3. A dispenser in accordance with claim 1, wherein:
said spreading means includes groups of distributed inflexible filaments.

4. A dispenser in accordance with claim 1, wherein: said spreading means includes an absorbent pad.

5. A dispenser in accordance with claim 1, wherein: said lock positioning means including an annular support mounted on said dispenser end of said housing and also including a projection extending radially outward from said annular support and axially away from said dispenser end.

6. A dispenser in accordance with claim 1, wherein: said rod includes a plurality of jack teeth;
said pushing means includes a lateral pushing arm pivotably connected to a circumferential edge of said removable cover at an end of said lateral pushing arm and forming a second class lever, said lateral pushing arm defining an opening and said rod passing through said opening, said lateral pushing arm having an oblique surface defining a portion of said opening, said oblique surface being engagable with said plurality of jack teeth on said rod, said pushing means also including a spring positioned between said container and said lateral pushing arm, said spring biasing said lateral pushing arm away from said dispenser end, said lateral pushing arm having a handle means with a portion extending radially out of said removable cover, and said handle means having another portion extending axially outside said container towards said dispenser end, said handle means for converting radial movements of said another portion into pivot movements of said lateral pushing arm.

7. A dispenser in accordance with claim 1, further comprising;
coupling means positioned between said expulsion base and said removable dispenser head, said coupling means connecting and disconnecting said dispenser head from said expulsion base non-destructively, said coupling means including a slide for slidably engaging said dispenser head with said expulsion base, said coupling means connecting and disconnecting one of a dispenser head with bristles and another dispenser head with an absorbent pad.

8. A dispenser in accordance with claim 6, wherein: said rod is rotatable in said container to selectively engage and disengage said jack teeth from said pushing means.

* * * * *